(12) United States Patent
Strandell

(10) Patent No.: US 9,878,396 B2
(45) Date of Patent: Jan. 30, 2018

(54) BEARING COMPONENT AND ITS MANUFACTURING METHOD

(71) Applicant: Ingemar Strandell, Sävedalen (SE)

(72) Inventor: Ingemar Strandell, Sävedalen (SE)

(73) Assignee: AKTIEBOLAGET SKF, Gothenburg (SE)

( * ) Notice: Subject to any disclaimer, the term of this patent is extended or adjusted under 35 U.S.C. 154(b) by 77 days.

(21) Appl. No.: 14/783,446

(22) PCT Filed: Apr. 7, 2014

(86) PCT No.: PCT/SE2014/000041
§ 371 (c)(1),
(2) Date: Oct. 9, 2015

(87) PCT Pub. No.: WO2014/168545
PCT Pub. Date: Oct. 16, 2014

(65) Prior Publication Data
US 2016/0303683 A1    Oct. 20, 2016

(30) Foreign Application Priority Data
Apr. 9, 2013   (SE) ........................... 1300258

(51) Int. Cl.
*B23K 20/00*   (2006.01)
*B23K 20/227*  (2006.01)
(Continued)

(52) U.S. Cl.
CPC ............ *B23K 20/227* (2013.01); *B23K 20/02* (2013.01); *B23K 20/023* (2013.01); *F16C 33/34* (2013.01);
(Continued)

(58) Field of Classification Search
CPC ..... B23K 20/02–20/021; B23K 20/001; B23K 20/04
(Continued)

(56) References Cited

U.S. PATENT DOCUMENTS 1,985,181 A * 12/1934 Matthews ................ G01K 5/66
228/193
2,438,759 A *  3/1948 Liebowitz .............. B23K 20/04
148/534
(Continued)

FOREIGN PATENT DOCUMENTS

CA    2615882 A1 * 11/2006 ............. F16C 33/62
EP    1131989 A2 *  9/2001
(Continued)

*Primary Examiner* — Kiley Stoner
(74) *Attorney, Agent, or Firm* — Bryan Peckjian; SKF USA Inc. Patent Dept.

(57) ABSTRACT

A bearing component and a method to form a bearing component. The bearing component comprises a first and a second metallic material wherein the first material presents a first carbon content and the second material presents a second carbon content, wherein the first material and the second material have been joined by a diffusion welding process. The diffusion welding process has resulted in a transition zone with a varying carbon content between the first material and the second material. The varying carbon content in the transition zone is essentially within an interval, wherein the interval end points are defined by the carbon content of the first material and the second material.

12 Claims, 3 Drawing Sheets

(51) Int. Cl.
  *B23K 20/02* (2006.01)
  *F16C 33/62* (2006.01)
  *F16C 33/64* (2006.01)
  *F16C 33/34* (2006.01)
  *B23K 103/04* (2006.01)
  *B23K 103/18* (2006.01)

(52) U.S. Cl.
  CPC .............. *F16C 33/62* (2013.01); *F16C 33/64* (2013.01); *B23K 2203/04* (2013.01); *B23K 2203/05* (2015.10); *B23K 2203/18* (2013.01); *F16C 2226/36* (2013.01)

(58) Field of Classification Search
  USPC .................................................. 228/193–195
  See application file for complete search history.

(56) References Cited

U.S. PATENT DOCUMENTS

| | | | | |
|---|---|---|---|---|
| 2,474,682 A | * | 6/1949 | Liebowitz | B23K 20/04 420/119 |
| 3,693,242 A | * | 9/1972 | Chivinsky | B23K 20/227 228/155 |
| 3,862,484 A | * | 1/1975 | Chivinsky | A47J 36/02 228/158 |
| 3,915,666 A | * | 10/1975 | Veitl | B32B 15/011 428/683 |
| 3,944,396 A | * | 3/1976 | Chivinsky | A47J 36/02 428/656 |
| 4,703,885 A | | 11/1987 | Lindgren et al. | |
| 5,271,546 A | * | 12/1993 | Hardwick | B23K 20/04 228/107 |
| 7,857,518 B2 | * | 12/2010 | Beer | F16C 33/62 384/492 |
| 9,555,501 B2 | * | 1/2017 | Strandell | B23K 20/02 |
| 2008/0212911 A1 | | 9/2008 | Beer et al. | |
| 2008/0296354 A1 | * | 12/2008 | Crockett | B23K 20/24 228/193 |
| 2009/0208773 A1 | * | 8/2009 | DuPont | B22F 3/1055 428/610 |
| 2012/0177527 A1 | * | 7/2012 | Kerrigan | C21D 1/25 419/29 |

FOREIGN PATENT DOCUMENTS

| | | | | |
|---|---|---|---|---|
| JP | 2005169420 A | | 6/2005 | |
| SU | 706216 A | * | 1/1980 | ............. A01B 15/02 |
| WO | 2010064145 A2 | | 6/2010 | |
| WO | WO 2013092413 A1 | * | 6/2013 | ........... B23K 20/021 |

* cited by examiner

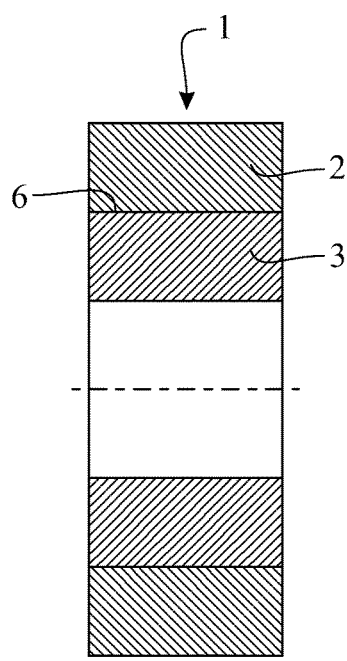
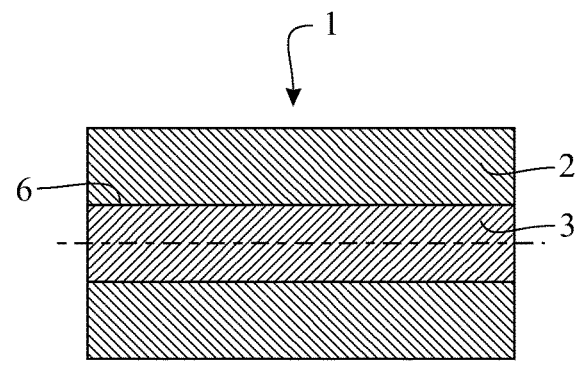
FIG. 1a　　　　　　FIG. 1b
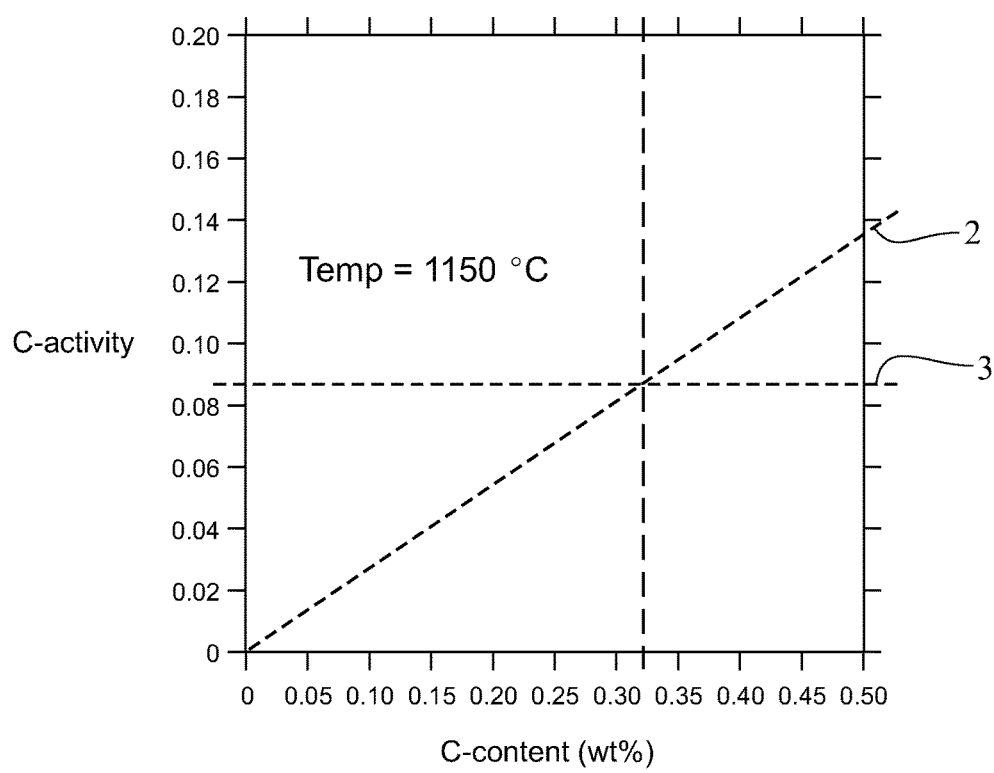
FIG. 2

BEARING COMPONENT AND ITS MANUFACTURING METHOD

CROSS REFERENCE TO RELATED APPLICATION

This is a United States National Stage Application claiming the benefit of International Application Number PCT/SE2014/000041 filed on 7 Apr. 2014 (07.04.2014), which claims the benefit of Sweden (SE) Patent Application 1300258-9 filed on 9 Apr. 2013 (09.04.2013), both of which are incorporated herein by reference in their entireties.

TECHNICAL FIELD

According to a first aspect, the invention presents a bearing component, such as an outer ring, an inner ring or a roller of a roller bearing.

According to a second aspect, the invention presents a forming method of the bearing component according to the first aspect of the invention.

BACKGROUND OF THE INVENTION

Forming a bearing component by joining two materials by diffusion welding and hot isostatic pressing is known.

SUMMARY OF THE INVENTION

An object of the invention is to provide an improved bearing component and its forming method.

According to the first aspect of the invention, the object has been achieved by providing a bearing component that has a first and a second metallic material wherein the first material presents a first carbon content and the second material presents a second carbon content. The first and second material have been joined by a diffusion welding process, wherein the diffusion welding process has resulted in a transition zone between the first and second material with a varying carbon content. The varying carbon content in the transition zone is essentially within an interval which end points are defined by the carbon content of the first and second material. It might easily be a small increase/decrease of carbon content at the edges of the transition zone, but it should not extend from the interval end points more than 5% of the total interval. When the carbon content is not essentially above or below the content of the first and the second material, it is an indication that the carbon has not reacted to form cementites or other complex metal or iron carbides that are hard and brittle. The strength of the transition zone is thus ensured.

The inventor has realized that the known methods to join two materials to form a bearing component by diffusion welding or hot isostatic pressing are sensitive to generate weak zones in the transition zone where the materials join each other, especially when joining materials of different qualities, such as cheaper cast steel with a high quality tool steel. One of the two joined materials may gain carbon in the joining process while the other material may lose carbon. The carbon gradients in the two materials may result in weak and brittle phases during a subsequent heat treatment. A transition zone with larger fraction of weaker brittle microstructure phases such as cementite networks or other complex metal carbides may significantly reduce the strength of any or both of the two joined materials. By selecting the alloying content of the two joining materials and/or adopting the process temperature the diffusion rate of carbon between the materials can be reduced. The hardening properties of both alloys are then to a large extent preserved and the volumes surrounding the transition zone will not have large volume of weak or brittle phases. The two materials keep its ability and microstructure all the way to the transition zone. The size of the transition zone is reduced and the potential problems of material brittleness etc. are reduced. The actual interface may still have less strength than the two joined materials. The original surface oxides and surface contaminations may still contribute to a strength reduction in the joining weld. This puts additional demands on process skill and surface preparations before process start. The problem with surface contaminations can for instance be reduced by careful surface cleaning and surface activation by the surfaces to be joined before, for instance by etching or any other means such as machining, grinding or blasting.

Carbon activity is a central term used to describe the invention. A carbon potential is explained by the ability of an environment containing active carbon to alter or maintain, under prescribed conditions, the carbon level of a steel. In any particular environment, the carbon level attained will depend on such factors as temperature, time and steel composition. Carbon potential is thus a difference in carbon activity between e.g. two materials. Thus if there is a difference in carbon activity, i.e. when the carbon potential is not zero, the carbon will diffuse from one material to the other.

The two materials to be joined have different carbon contents. Those carbon contents define the end points of the interval of carbon there between. By carbon content is meant the medium value in the material. The carbon content may naturally vary and have local variations both in the material as such but in particular around the circumferential surface of the bearing component, but what is meant is the overall medium value of the material. As an example; when joining a material with 3 weight percent (wt %) carbon with a 1 wt % carbon material, the interval is 2 wt % carbon and the interval end points are 3 and 1 wt % carbon, hence the same as the medium carbon value of the first and the second material. The transition zone is the area where the change in carbon content due to the joining process can be observed in the materials.

Exemplifying and advantageous embodiments of the bearing component according to the first aspect of the invention will now be presented.

According to an embodiment of the bearing component the varying carbon content in the transition zone between the first and the second material is essentially linear. By linear change in carbon content is meant that the measured carbon content in the transition zone does not vary by having less carbon content and then suddenly having increased carbon content, i.e. the plotted carbon content profile should not vary between a positive and negative derivative to a large extent. Thus by linear is also meant a sudden change from the carbon content of one material to the other, which is the preferred profile, as long as it does not vary largely along the way. The carbon content shall be measured along the cross section of a bearing component, the cross section being made perpendicular to the surface where the two materials join. Having this said, the surface to be joined does by no means need to be flat, since also rounded surfaces have a perpendicular direction. Having a linear transition of the varying carbon content is an even clearer indication that the carbon has not reacted to form cementites or other complex metal or iron carbides that are hard and brittle. There may be small variations, but any un-linear change, i.e. where the plotted carbon content curve goes from positive to negative to positive again or vice versa, of carbon content in the transition zone should be less than 50% of the carbon content interval, preferably less than 25% than the total interval defined by the carbon content of the two materials. This generates a transition zone that has the potential to be strong.

In an embodiment of the bearing component, at least 80% of the change in carbon content between the first and second material takes place at a distance of less than 200 μm measured perpendicularly to the joining surface. In another embodiment of the bearing component, at least 80% of the total change in carbon content takes place at a distance of 100 μm measured perpendicularly to the joining surface. This describes a sudden change from the carbon content of one material to the other, which is the preferred profile, since the joining process has not affected the properties of the materials to a large extent, but is limited to small portion if the overall component. This further strengthens the transition zone and the overall quality of the bearing component.

In an embodiment of the bearing component one of the materials is a bearing steel. Of special interest are corrosion resistant and/or wear resistant steels. In an embodiment one of the materials is a M50 steel. In a further embodiment one of the materials is a M50NIL steel. In yet another embodiment one of the materials is any of the traditional bearing steel as shown in ISO 683-17:1999(E) pages 9-10. Any other steels that meet the steel cleanliness and hardness requirements of a bearing component could be used, for instance stainless tool steels. In a further embodiment the material used is a martensitic hardenable stainless N-alloyed steel, such as XD15NW or stainless martensitic hardened made with good steel cleanliness and suitable for surface enrichment. The invention is however not limited to these steels. The benefit of using these types of steel is that the portion consisting of this material will be very robust against wear and corrosion for instance. Hence the high quality bearing steel is preferably located around the highly stressed areas of the bearing components, for instance around the raceway of the rings or the rolling surface of the roller. It could also be located for instance at a flange or any other portion or area of the bearing component, or combinations of flange, raceways and rolling surfaces.

In an embodiment the bearing component is an inner ring, an outer ring or a roller of a roller bearing. The component could belong to any bearing type, such as a spherical roller bearing, cylindrical roller bearing, or tapered roller bearing or deep groove ball type bearings. It can be radial bearings as well as axial thrust type bearings, and bearings having single row or several rows of rolling elements. It can be axial and radial ball bearings with a single row or several rows of balls.

According to the second aspect of the invention, the object has been achieved by providing a method to form a bearing component according to the first aspect of the invention. The method to form a bearing component comprises steps of heating the first and second material, pressing them against each other under specific pressure, period of time and temperature, thereby allowing the materials to diffuse into each other. Further, the first material presents a carbon activity of 80-120% of the carbon activity of the second material at the temperature of joining. In another embodiment of the bearing component forming method, the carbon activity of one of the materials to be joined is 90-110% of the other material. In a further embodiment of the bearing component forming method, the carbon activity of one of the materials to be joined is 95-105% of the other material. In yet another embodiment, the carbon activity is essentially the same as the other material at the temperature of joining, but it could also be 99-101%, 98-102%, 97-103% of the other material. Carbon activity can be affected both by changing the carbon content in the material, with other alloying elements kept constant and/or by changing the temperature of the material. Both of these dimensions can be tampered with to adjust the carbon activity to optimize the bearing component forming method.

The benefit of having materials with the same or similar carbon activity is that the phenomena where one of the two joined materials gain carbon in the joining process, while the other material may lose carbon, is avoided. Hence there are no carbon gradients in the two materials from the process that may result in weak and brittle phases during a subsequent heat treatment. Since a transition zone with larger fraction of weaker brittle microstructure phases such as cementite networks or other complex metal carbides may significantly reduce the strength of any or both of the two joined materials, this ensures that the bearing component is robust and durable.

All aspects of the first aspect of the invention are applicable to all aspects of the second aspect of the invention and vice versa. Exemplifying and advantageous embodiments of the bearing component according to the second aspect of the invention will now be presented.

In an embodiment of the method to form a bearing component, the forming method is made by means of hot isostatic pressure. The materials are placed together and at the temperature, time and pressure as described more in the other embodiments of the invention.

In an embodiment of the method to form a bearing component, the temperature of joining is 1000-1300 degrees Celsius (C). In another embodiment of the method to form a bearing component, the temperature of joining is 1100-1200 degree C. In a further embodiment of the method to form a bearing component, the temperature of joining is 1140-1160 degree C., preferably 1150 degree C. But it could also be 1145-1155 degree C. for instance. In an embodiment of the method, the hot isostatic pressing is conducted during 1-6 hours, preferably during 2-4 hours.

In an embodiment of the method to form a bearing component, the pressure is 80-310 MPa.

In an embodiment of the method to form a bearing component, at least one of the first and the second material is in powder form before heating. In another embodiment, it is the bearing steel that is in powder form before heating. In a further embodiment of the method to form a bearing component, a sheet metal is used to encapsulate the powder during the joining process. The sheet metal is then removed. The sheet metal used as an example in this embodiment can be exchanged to any other suitable material known to the person skilled in the art.

In an embodiment of the bearing component forming method, the bearing component is an inner ring, an outer ring or a roller of a roller bearing. The component could belong to any bearing type, such as a spherical roller bearing, cylindrical roller bearing, tapered roller bearing or deep groove ball type bearings. It can be radial bearings as well as axial thrust type bearings, and bearings having single rows or several rows of rolling elements. It can be axial and radial ball bearings with a single row or several rows of balls.

In an embodiment of the bearing component forming method, the bearing component is made by joining a larger piece which is subsequently cut into smaller components. To form a ring a cylinder shaped element of one of the materials could be joined with another material, after which the cylindrical shaped element can be cut into ring elements. To form a roller a rod shaped element of one of the materials can be joined with the second material, and then cut into roller elements.

BRIEF DESCRIPTION OF DRAWINGS

Exemplifying embodiments will now be described more in detail with reference to accompanying drawings, as well as examples of undesirable features that the invention help to prevent, wherein FIG. 1a shows a cross section of a bearing ring made out of two materials according to the invention;

FIG. 1b shows a cross section of a roller for a bearing made out of two materials according to the invention;

FIG. 2 shows a graph illustrating two materials having the same carbon activity at a specific temperature. The carbon activity of the first material 2 is plotted while increasing its carbon content according to the invention;

Figure 3:
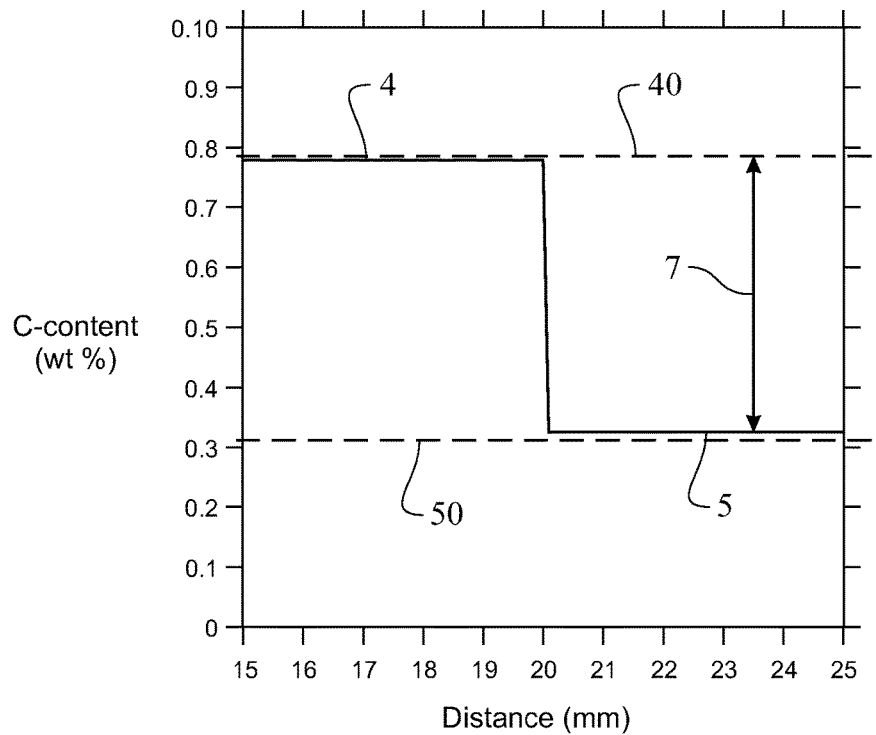
FIG. 3 shows a graph of a desirable sudden carbon content change according to the invention.

The drawings present examples of the invention, and the undesirable features that the invention helps to prevent, in diagrams and graphs. These are exemplifying embodiments, thus they are not drawn to scale. Some details and features may even be exaggerated to better explain the invention. The invention is not limited to the embodiments and drawings described herein.

DETAILED DESCRIPTION OF DRAWINGS

FIG. 1a shows a cross section of a bearing component 1 according to the invention, bearing component 1 being a ring. The bearing ring comprises a first 2 and a second 3 material wherein the diffusion welding process has resulted in a transition zone 6 between the first 2 and second 3 material. The figure shows a bearing ring, where the materials are aligned along the full width of the component, but it could also be so that one material is only applied on a selected portion of the component, such as for instance a raceway or a flange (not shown in figure).

FIG. 1b shows a cross section of a bearing component 1 according to the invention, bearing component 1 being a roller. The roller comprises a first 2 and a second 3 material wherein the diffusion welding process has resulted in a transition zone 6 between the first 2 and second material 3. The figure shows a roller where the materials are aligned along the full width of the component, but it could also be so that one material is only applied on a selected portion of the component, such as for instance the main rolling surface or at the edges of the roller, etc.

FIG. 2 shows a table illustrating two materials 2, 3 having the same carbon activity at a temperature of 1150 degrees Celsius (C). The carbon activity of the first material 2 is plotted while increasing its carbon content until the same carbon activity as the second material 3 is obtained. In this case the first material 2 needs to have a carbon content of 0.30-0.35 wt % to have the same carbon activity as the second material 3 of around 0.09 at the temperature of 1150 degrees C. Carbon activity can be affected both by changing the alloying content in the material, and by changing the temperature of the material. Both of these dimensions can be tampered with to adjust the carbon activity to optimize the bearing component 1 forming method. Hence an alternative way to optimize the carbon activity of the two materials if the carbon content of the materials to be joined is fixed, for instance if both materials are in solid form instead of one of them being in powder form, or if a specific alloy is needed, the temperature can be changed instead. The numbers of temperatures, carbon content and carbon activities given in this example can of course be different depending on the circumstances given with temperatures and materials to join etc.

FIG. 3 shows a graph of a desirable sudden carbon content change according to the invention. Here it can be clearly seen that the carbon content changes suddenly at a depth if 20 mm from the surface of the bearing component, and it is clearly within the interval's 7 end points 40,50 defined by the carbon content 4,5 of the first 2 and second 3 material, in this case roughly 0.3 wt % and 0.8 wt %. The carbon content have not increased at any points, which indicates that the carbon has not formed cementites or other forms of complex metal or iron carbides that can be larger in comparison to the surrounding structure, for instance a martensitic structure, thus generally weaker than the surrounding materials. This is unacceptable in high performance mechanical components, such as high quality bearing components 1.

Figure 4:
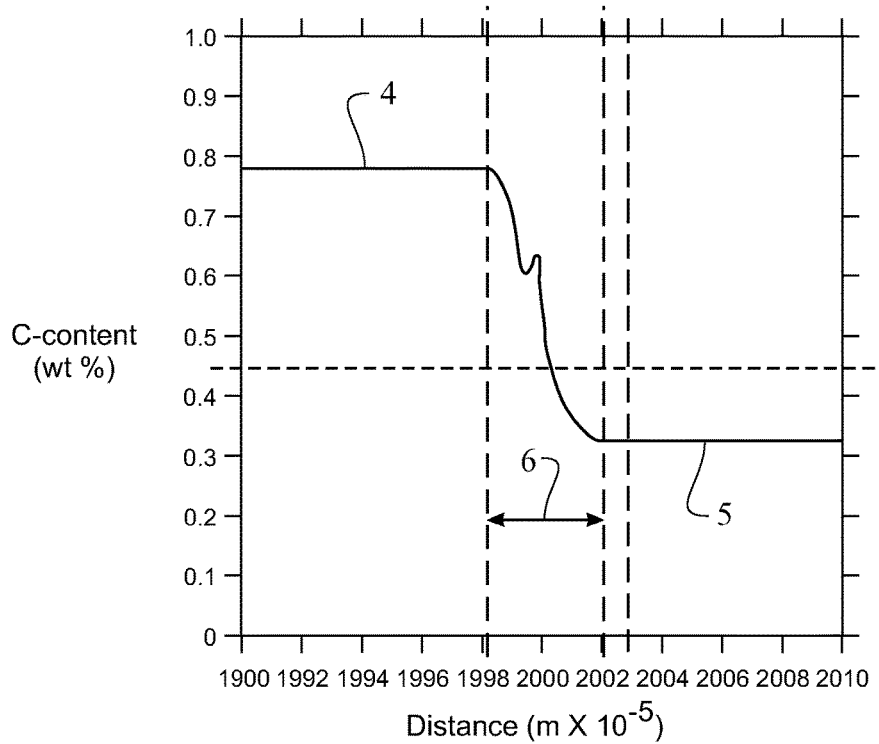
FIG. 4 shows a graph of the transition zone 6 of FIG. 3 on a μm level according to the invention.

FIG. 4 shows a graph of the desirable sudden carbon content change of FIG. 3 on a m*10-5 level according to the invention. This shows that even though the carbon content change in the transition zone 6 is essentially linear, meaning that the measured carbon content profile should not vary between a positive and negative derivative when looking at this plotted curve of the carbon content in the transition zone 6 when measured perpendicularly from the surface of the two materials to be joined, there may be measured variations to this. Small variations occur naturally in the material, but it could also be due to the equipment used when measuring and how delicate it is of course. With reservation for this, any un-linear change of carbon content in the transition zone 6 should be less than 50% of the carbon content interval (7 in FIG. 3) defined by the carbon content 4,5 of the of the two materials, in this case roughly 0.3 wt % and 0.8 wt %. Preferably any un-linear change of carbon content is less than 25% of the carbon content interval (7 in FIG. 3) It is also clear from the graph that more than 80% of the total change in carbon content interval (7 in FIG. 3) in the transition zone 6 takes place within a measured distance of 50 μm in the radial distance of the bearing component's 1 cross section, even within a distance of 40 μm.

Figure 5:
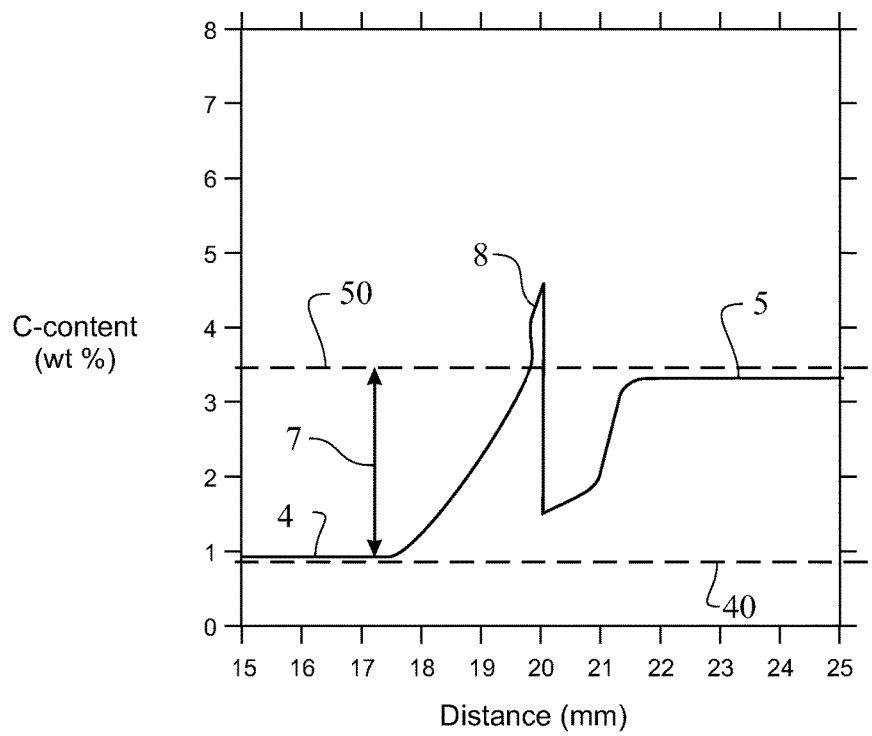
FIG. 5 shows a graph illustrating an undesirable carbon content change.

FIG. 5 shows a graph illustrating an undesirable peak 8 in carbon content. The carbon has clearly moved from one material to the other. The curve is un-linear and the carbon content clearly exceeds the interval 7 end points 40,50 defined by the carbon contents 4,5 of the materials, in this case roughly 1 wt % and 3.5 wt %. This happened at a depth of 20 mm from the surface of the bearing component.

Figure 6:
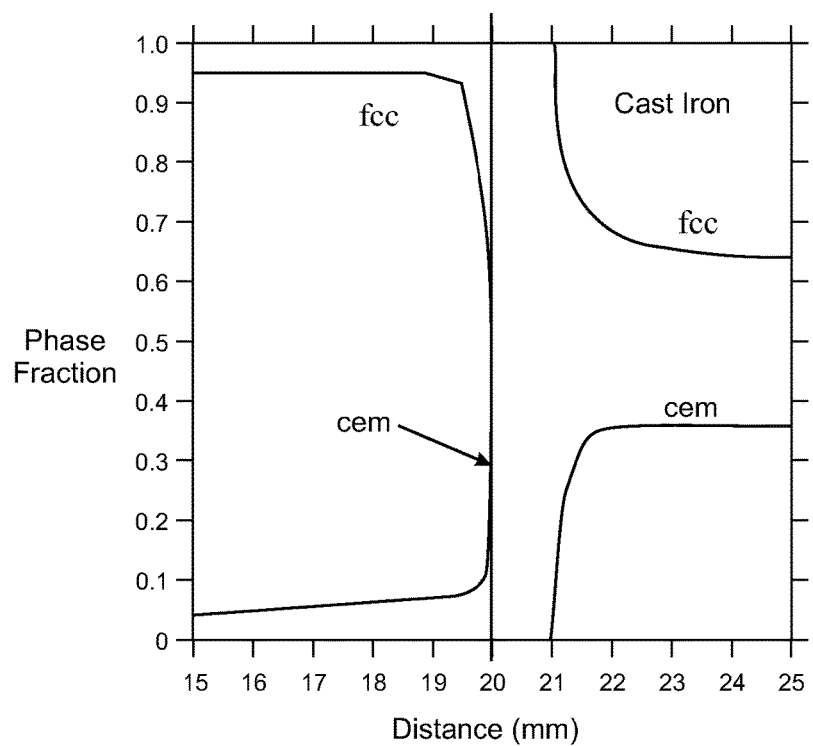
FIG. 6 shows a graph illustrating a phase fraction during the undesirable carbon content change from FIG. 5.

FIG. 6 shows a graph illustrating a phase fraction during the undesirable carbon content change from FIG. 5. It can be clearly seen that the carbon content increase that went beyond the interval (7 in FIG. 5) in an un-linear way, has resulted in a zone where the austenitic (fcc) microstructure has increased dramatically, simultaneously as larger fraction of weaker brittle microstructure phases such as cementite (cem) networks or more complex metal carbides has formed. Both microstructures went from being around 10% of the total microstructure to around 90% at a depth off 20 mm from the surface of the bearing component. This may significantly reduce the strength of any or both of the two joined materials. The cementite structure does not necessarily have to occur during the joining as such, but the higher level of carbon content could react and form a weak and brittle cementite phases during a subsequent heat treatment. At a depth off 21 mm from the surface of the bearing component we can see the normal face fractions of the materials again consisting of cementite and austenitic cast iron to a large extent.

The invention claimed is:

1. A method to form a bearing component, comprising:
a first metallic material and a second metallic material, wherein the first metallic material presents a first carbon content and the second metallic material presents a second carbon content,
wherein the first metallic material and the second metallic material have been joined by a diffusion welding process, wherein the diffusion welding process has resulted in a transition zone with a varying carbon content between the first metallic material and the second metallic material, and
wherein the varying carbon content in the transition zone is essentially within an interval, and
wherein the interval end points are defined by the carbon contents of the first metallic material and the second metallic material, the forming method comprising steps of:
heating the first metallic material and the second metallic material and pressing them against each other under a specific pressure and for a period of time thereby allowing the materials to diffuse into each other at a joining temperature,
wherein the first material having a first carbon activity that increases linearly as the first carbon content increases due to the step of heating, the second material having a second carbon activity that is constant during the step of heating as the second carbon content increases, the first metallic material presents a first carbon activity essentially similar to a second carbon activity of the second metallic material at the joining temperature such that there are no carbon gradients in the first material and no carbon gradients in the second material.

2. The method to form the bearing component according to claim 1, wherein the the carbon content changes at a depth of twenty millimeters from a surface of the bearing component.

3. The method to form the bearing component according to claim 1, wherein carbon has not formed cementites or iron carbides that are larger relative to a surrounding structure in the bearing component.

4. The method to form the bearing component according to claim 1, wherein the forming method is done by a hot isostatic pressing.

5. The method to form the bearing component according to claim 1, wherein the temperature is 1000-1300 degrees C.

6. The method to form the bearing component according to claim 1, wherein the temperature is 1100-1200 degrees C.

7. The method to form the bearing component according to claim 1, wherein the temperature is 1140-1160 degrees C.

8. The method to form the bearing component according to claim 1, wherein the pressure is 80-310 MPa.

9. The method to form the bearing component according to claim 1, wherein at least one of the first metallic material and the second metallic material is in powder form before heating.

10. The method to form the bearing component according to claim 1, wherein the bearing component is subsequently cut into at least two pieces creating at least two bearing components.

11. The method to form the bearing component according to claim 1, wherein the bearing component is one of:
an inner ring of a bearing, or
an outer ring of a bearing, or
a roller of a roller bearing.

12. The method to form the bearing component according to claim 1, wherein the temperature is 1150 degrees C.

* * * * *